March 30, 1948.　　　C. H. BOYLAN　　　2,438,776
PACKLESS BACK-SEATING VALVE
Filed Jan. 24, 1946　　　5 Sheets-Sheet 1

INVENTOR.
Charles H. Boylan
BY Richey & Watts
ATTORNEYS

March 30, 1948.

C. H. BOYLAN 2,438,776

PACKLESS BACK-SEATING VALVE

Filed Jan. 24, 1946

INVENTOR.
Charles H. Boylan
BY
Richey & Watts
ATTORNEYS

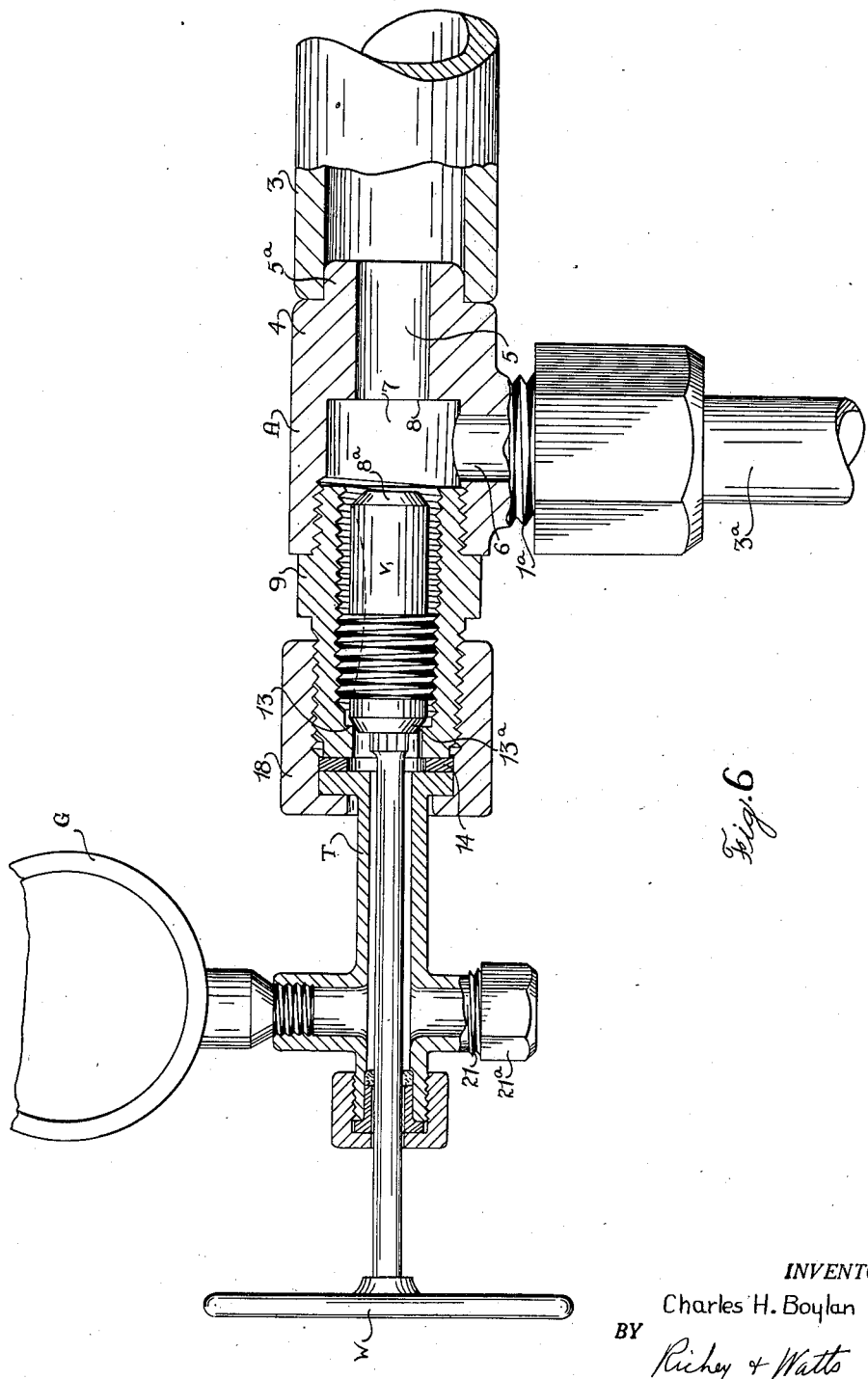

Patented Mar. 30, 1948

2,438,776

UNITED STATES PATENT OFFICE 2,438,776

PACKLESS BACK-SEATING VALVE

Charles H. Boylan, Lakewood, Ohio, assignor to The Weatherhead Company, Cleveland, Ohio, a corporation of Ohio Application January 24, 1946, Serial No. 643,008

7 Claims. (Cl. 251—22)

This invention relates to a valve, and more particularly it relates to an improvement in a back-seating valve adapted to be used in refrigeration and similar apparatus.

Although certain features of the valve of this invention are not limited to refrigerating devices, the functions and utility of the valve will be described in conjunction with a refrigeration system. The usual refrigeration system includes three basic devices connected by suitable piping and fittings. These are the compressor which compresses the gaseous refrigerant, the condenser which removes the heat of compression and liquifies, and the evaporator wherein the refrigerant expands absorbing heat in the process. It has been found convenient both in manufacture and in the distribution of these units to produce the system in several sections. For example, one section may include the compressor and the condenser connected together, and fittings extending from each for connection with the other section. The other section usually comprises the evaporator and connecting piping. Of course it is also possible to provide three sections so that the compressor, condenser and evaporator are all separate. It has been the practice to charge each section with refrigerant separately and to provide valves which permit charging to take place and which effect sealing of the sections from the atmosphere after charging. The special valves provided for this purpose in the prior art have been expensive and complicated and they have required packing arrangements to seal them from leakage. It is an object of this invention to provide a valve which permits the unit charging referred to above and which is devoid of expensive packed joints and other external fittings; thereby saving in cost of manufacture and insuring against leakage of the refrigerant during the pre-installation period.

Other objects and advantages of my invention will become apparent from the following description of preferred forms of this invention, reference being made to the accompanying drawings.

Fig. 6 shows the valve connected to both sections of the refrigerating system and the tool fitted to open the valve to its operating position.

Figure 1:
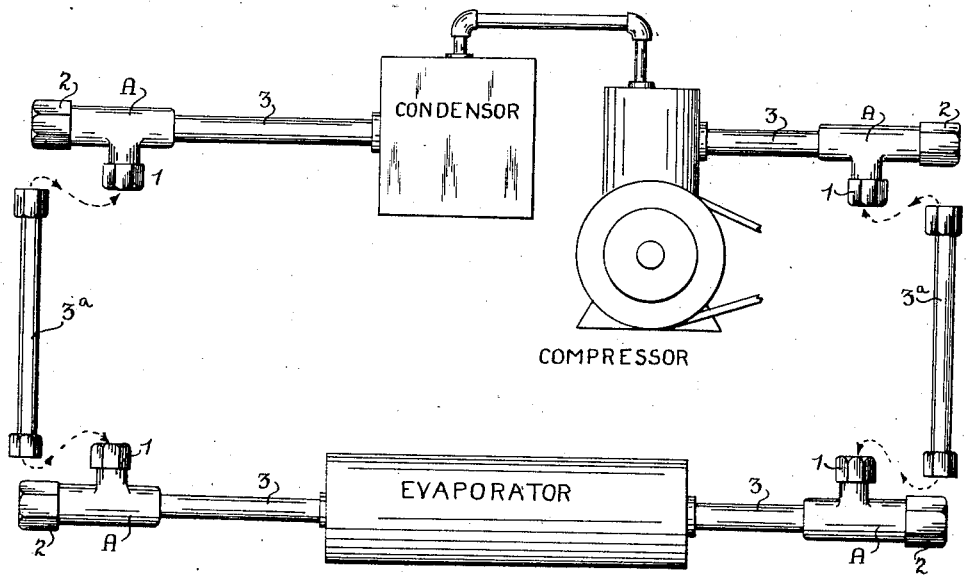
Fig. 1 is the diagram of a refrigerating system assembled in two sections and fitted with four valves made in accordance with one form of this invention.

Referring now to the drawings, Fig. 1 illustrates diagrammatically one type of a two-section refrigeration system which will be used as an example of how one form of the valve of this invention may be used. As can be seen in the figure, the compressor and condenser are connected together by a conduit and both units have terminal conduits 3, each of which is fitted with a special valve A, made in accordance with this invention. Likewise, the evaporator has a pair of conduits 3, each fitted with a valve A. The two sections thus formed are assumed to have been previously charged in a manner which will be described presently. Valve A is shown provided with sealing caps 1 and 2 for shipment. A pair of connecting conduits 3a is shown to illustrate diagrammatically how the two sections of the refrigeration device are connected up during installation. The description which follows will not only describe the detailed construction of valve A but will include a description of how the valve is used in conjunction with the illustrative refrigeration system shown in Fig. 1.

Figure 2:
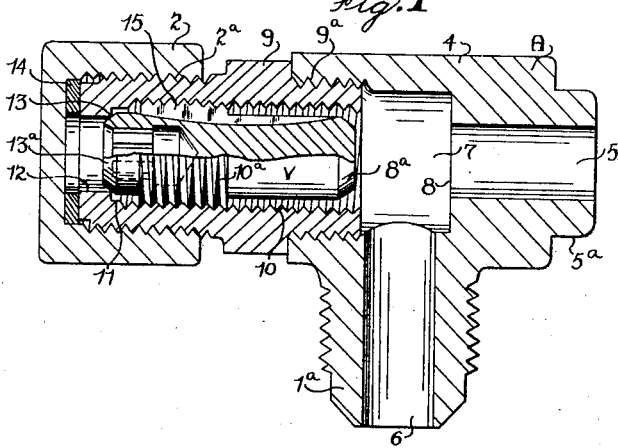
Fig. 2 is a cross-sectional view of one form of the valve.
Figure 3:
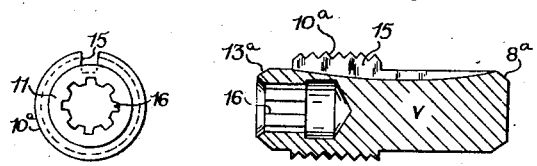
Fig. 3 illustrates the movable valve member employed in the various valves of this invention.

The details of the valve A are best illustrated in Figs. 2 and 3 in which it can be seen that valve A includes a valve body section 4 containing an outlet 5 and nipple 5a, and a second passageway 6 in a nipple 1a. Another body section 9 of valve A is threaded into body section 4 by threads 9a. Body section 9 is internally threaded at 10, and the body also includes a bore 11 joining a smaller bore 12. The junction of these two bores forms a circular seat 13. Gasket 14 and sealing cap 2 previously described cooperate with threads 2a on body section 9 to seal that portion of the valve. An important feature of the valve in this invention lies in the construction of the movable valve member V. This member is provided with an externally threaded portion 10a which fits the internal threads 10 of body section 9 of the valve. The remainder of valve member V is of smaller diameter than the threads to provide fluid clearance between it and the internal threads in valve body section 9. A longitudinal slot 15 is formed in valve member V to provide clear passage for fluid from one end of the valve member to the other, despite the fact that the threaded portions 10 and 10a are in engagement within the valve. Valve member V is also formed with a chambered portion containing splines 16 for reception of a tool which will be described presently. As can be seen in Figs. 2 and 3, the ends of valve member V are formed with conical seats 13a and 8a, the function of which will become apparent as this description proceeds.

Figure 4:
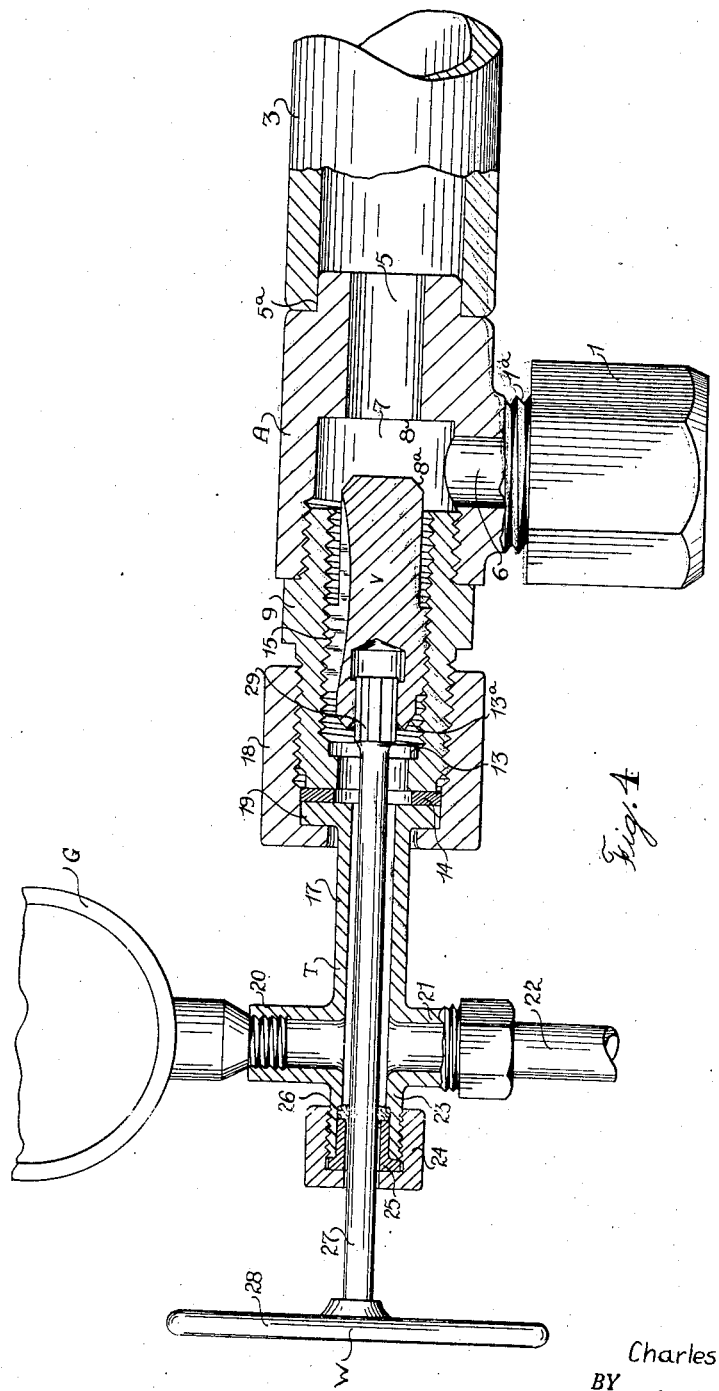
Fig. 4 illustrates the valve of this invention fitted with a special charging and testing tool, the valve being in its charging position.

The use of the valve A in the system will now be explained in connection with the series of drawings the first of which is Fig. 4. In Fig. 4 conduit 3 is shown connected to nipple 5a of valve A this being a permanent connection to one of the two sections of the refrigerating system described previously. The other nipple 1a is shown sealed by the cap 1 previously mentioned in connection with Fig. 1, this cap being fitted before installation. To the left of the figure can be seen a special tool T which is used by the service personnel. This tool T is a special fitting to provide for charging the section, testing pressure and opening and closing various ports of valve A. Tool T includes a longitudinally apertured body portion 17 and an attaching nut 18 which pulls flange 19 of the tool into sealing engagement with gasket 14 and the end of body section 9 of valve A. The tool may include a nipple 20 which is provided with any standard means for the attachment of a test gage G. Nipple 20 may be omitted or plugged if desired. Another nipple 21 is provided with any conventional attaching means or threads to receive a line 22 connected to a refrigerant charging tank, or to a dehydrating apparatus if it is wished to dehydrate the system. An extending portion 23 of the tool body 17 is threaded to receive a packing nut 24 which in conjunction with a packing sleeve 25 and packing 26 forms a packed joint with the shank 27 of a special wrench W which forms part of the tool T. Handle means 28 may be provided on the wrench at one end and at the other end an exteriorally splined portion 29 is formed to cooperate with the internal splines 16 in valve member V.

The charging operation for the section in question may be performed in the following manner: First, the tool T is fitted to the valve body section 9. Care is taken to see that cap 1 is securely tightened on valve A before line 22 from the charging tank is opened to the tool. Wrench W is then manipulated to turn valve member V and the valve is moved to the right until conical seat 13a is well clear of seat 13 in the body section of valve A. Refrigerant can now flow from the tank into the section being charged by passing through the space surrounding the shank 27 of the tool, into the valve A itself, through slots 15 of valve member V, and on out chamber 5 and the conduit 3 into the associated refrigerating section. The charging nipple 9 of the other valve in the section being charged may be open to the atmosphere or connected to a return line leading to the charging unit, this being standard practice in the art. When the proper amount of refrigerant has been introduced into the section, wrench W is turned still further until conical seat 8a on valve member V engages seat 8 in the body of valve A.

Figure 5:
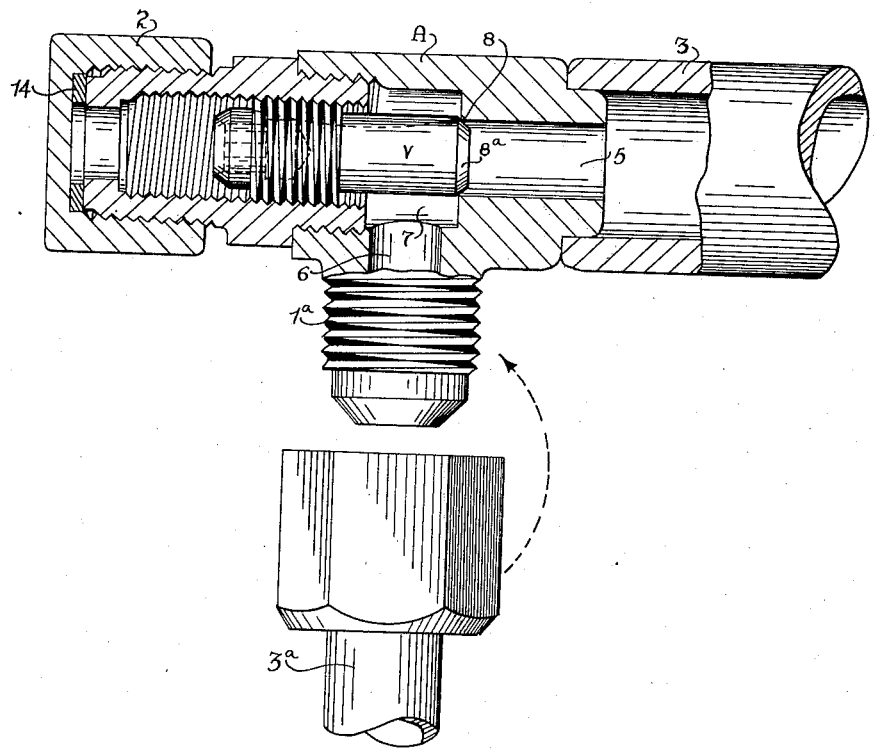
Fig. 5 shows the valve in the position to which it is set during the pre-installation period, the unit being charged.

Now referring to Fig. 5, valve member V is shown with seat 8a engaging seat 8 in body section 4 of valve A. This effectively seals the charged passage 5 and tube 3 from all other portions of valve A. For this reason the tool T shown in Fig. 4 can be removed without loss of fluid from the refrigerating section. Then, as shown in Fig. 5, the cap 2 may be replaced, which, with gasket 14, completely seals that portion of the valve from any dirt or foreign matter. When the two charged sections of the refrigerator are to be connected together, connections 3a shown in Fig. 1 and also in Fig. 5 are made with nipples 1a of valve body section 4 of valve A. Nothing happens at this time because the fluid in all sections is sealed in both sections by the engagement of their respective valve members V with valve seats 8. After lines 3a are connected to the valves the operation shown in Fig. 6 is performed. In this figure, connecting line 3a is shown attached to the valve and tool T has been reapplied to valve A. Now referring back to Fig. 5, it can be seen that cap 2 has merely been acting as a dust cap and can be removed to apply tool T as in Fig. 6 without loss of fluid. Before tool T can be used in this operation, charging nipple 21 must be sealed off from the atmosphere by cap 21a, by a valve, or by any other means. After tool T is applied and so sealed, wrench W is manipulated and turned to drive valve member V back to its original position with conical seat 13a engaging seat 13 in the body of valve A. As soon as this motion begins, the other conical seat 8a of valve member V is pulled away from seat 8 and fluid connection is made between connecting line 3a and line 3 by means of chambers 5, 6 and 7. However, between the time when seat 8 is disengaged and seat 13a is engaged, no fluid can escape because tool T is completely sealed. After the valve is back-seated at 13a, nut 18 and tool T can be removed without danger of loss of fluid. Dust cap 2 shown in Figs. 1, 2 and 5 can then be replaced and connection of the parts at this particular valve is completed.

The procedure for applying and using the tool and the valve just described in connection with one unit is carried out for the remaining valve units A, illustrated in Fig. 1, thereby completing the installation of refrigeration system.

It can now be seen that this invention provides an improved valve which permits the various charging, testing, and connecting operations to be performed without danger of fluid loss and without requiring any expensive packed joints in the valve itself. It has been found that packed joints, that is, joints where a tool or valve stem or other arrangement must be made movable within a packing seal, are subject to leakage in refrigerating and other systems. Furthermore, the packing in such joints gradually deteriorates, particularly if the stem or other arrangement is manipulated with any frequency and bits of packing work their way into the refrigeration system to clog the expansion valve. And finally such packed joints have been found to be expensive to manufacture and difficult to maintain. On the other hand, the valve of this invention performs all the functions of the previous valves which contained packed joints, and yet it requires no sealing gasket or packing whatsoever. A simple flat gasket 14 has been shown but this acts merely as a dust seal, and the system could be operated and maintained fluid tight even if that gasket were dispensed with.

The details of construction of the special tool T have been explained in this specification merely as an aid to an understanding of one method whereby the valve of this invention may be utilized. The attaching means 1a and 5a for the conduits can be made up in any manner, those illustrated being merely examples of standard practice. Likewise the provision of a two-part valve body made up of sections 4 and 9 is merely illustrated as a form particularly adaptable to simple machining operations. The exact method whereby the valve body portion of valve A is built up is not critical to this invention. In addition, it is not intended that the sample method of using the valve presented here limits the number and sequence of operations performed in any manner.

Figure 3A:
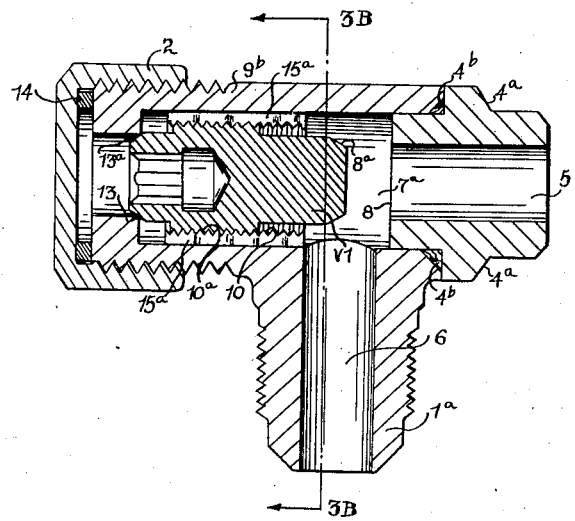
Fig. 3A is a modified form of the valve shown in Fig. 2.
Figure 3B:
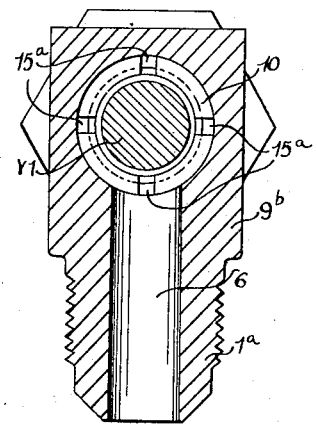
Fig. 3B is a cross-sectional view of the modified valve taken on the line 3A—3A of Fig. 3A.

Figs. 3A and 3B illustrate a modification of the valve shown in Figs. 2 and 3, the difference being only in the construction of the valve and not in its operation and use. In the modified form, valve body 9b has internal threads 10 which threads are interrupted by one or more slots 15a. The slot or slots 15a serve the same function as does the slot 15 in valve member V shown in Figs. 2 and 3. Thus, in the modification here described the valve member V1 may have uninterrupted threads, the slot 15a in valve body 9b performing the function of the interruption. Another difference in the construction of Fig. 3A lies in formation of valve body 9b to include chamber 7a which chamber in Fig. 2 was formed in the valve body section 4. In the construction shown in Fig. 3A valve body section 4a is a cap member soldered or brazed to body section 9b at 4b and formed to provide the seat 8 for the conical portion 8a of valve member V1 and the outlet aperture 5. The construction shown in Fig. 3A has the advantage that no milling operation on valve member V to provide a slot 15 is required. The slots 15a in body section 9a can be formed by a broaching operation, the broach entering through chamber 7a in body section 9a.

The two forms described, namely that in Fig. 2 wherein the passage is formed in the valve member, and that in Fig. 3A wherein it is formed in the valve body, both have the same mode of operation and both embody the principles of the invention.

Having thus described the present invention so that others skilled in the art may be able to understand and practice the same, I state that what I desire to secure by Letters Patent is defined in what is claimed.

What is claimed is:

1. A valve comprising a valve body having two fluid conducting ports and valve seat means between said ports, said valve body including a third port, second valve seat means between said third port and said first two ports, a valve member threaded into said valve body and having portions formed to selectively engage said valve seats, the threads lying between the third port and the first two ports, said valve having passageway means formed to permit communication between said third port and said first two ports, said valve member being provided with driving means to receive a tool, and means on said valve body for attachment of a fluid conducting housing for said tool.

2. A valve comprising a valve body having two fluid conducting ports and valve seat means between said ports, said valve body including a third port, a valve member threaded in said valve body, passageway means formed in said valve whereby said third port may communicate with said first two ports, second valve seat means between said third port and said first two ports, said valve member having portions formed to selectively engage said valve seats, said valve member having driving means formed adjacent its outer end for reception of an operating tool, and means on said valve body for attachment of a fluid conducting housing for said tool.

3. A packless valve comprising a valve body having two fluid conducting ports and valve seat means between said ports, said valve body including a third port, a valve member threaded in said valve body, passageway means formed in said valve whereby said third port may communicate with said first two ports, second valve seat means between said third port and said first two ports, said valve member having portions formed to selectively engage said valve seats, said valve member having driving means formed adjacent its outer end for reception of an operating tool, and means on said valve body for attachment of a fluid conducting housing for said tool.

4. A valve comprising a valve body having two fluid conducting ports and valve seat means between said ports, said valve body including a third port, a valve member threaded in said valve body, passageway means formed in said valve whereby said third port may communicate with said first two ports, second valve seat means between said third port and said first two ports, said valve member having portions formed to selectively engage said valve seats, an outer end portion of said valve member being provided with driving means formed adjacent its outer end for reception of an operating tool, and means on said valve body surrounding said third port for attachment of a fluid conducting housing for said tool to said third port.

5. A packless valve comprising a valve body having two fluid conducting ports and valve seat means between said ports, said valve body including a third port, a valve member threaded in said valve body, passageway means formed in said valve whereby said third port may communicate with said first two ports, second valve seat means between said third port and said first two ports, said valve member having portions formed to selectively engage said valve seats, an outer end portion of said valve member being provided with driving means formed adjacent its outer end for reception of an operating tool, and means on said valve body surrounding said third port for attachment of a fluid conducting housing for said tool to said third port.

6. A valve comprising a valve body having two fluid conducting ports and valve seat means between said ports, said valve body including a third port, a valve member threaded in said valve body, passageway means formed in said valve whereby said third port may communicate with said first two ports, second valve seat means between said third port and said first two ports, said valve member having seat portions on opposite sides of its threads to selectively engage said valve seats, said valve member having driving means formed adjacent its outer end for reception of an operating tool, and means on said valve body for attachment of a fluid conducting housing for said tool.

7. A valve comprising a valve body having two fluid conducting ports and valve seat means between said ports, said valve body including a third port, a valve member threaded in said valve body, passageway means formed in said valve whereby said third port may communicate with said first two ports, second valve seat means between said third port and said first two ports, said valve member having seat portions formed on opposite sides of its threads to selectively engage said valve seats, an outer end portion of said valve member being provided with driving means formed adjacent its outer end for reception of an operating tool, and means on said valve body surrounding said third port for attachment of a fluid conducting housing for said tool to said third port.

CHARLES H. BOYLAN.

REFERENCES CITED

The following references are of record in the file of this patent:

UNITED STATES PATENTS

| Number | Name | Date |
|---|---|---|
| 1,797,591 | Sartakoff | Mar. 24, 1931 |
| 2,074,091 | McKinnon | Mar. 16, 1937 |